United States Patent
Langhans

(10) Patent No.: US 7,259,907 B2
(45) Date of Patent: Aug. 21, 2007

(54) LASER-ACTIVE OPTICAL FIBER FOR A FIBER LASER OR AN OPTICAL FIBER AMPLIFIER

(75) Inventor: Lutz Langhans, Starnber (DE)

(73) Assignee: Carl Baasel Lasertechnik GmbH & Co. KG, Starnberg (DE)

( * ) Notice: Subject to any disclaimer, the term of this patent is extended or adjusted under 35 U.S.C. 154(b) by 0 days.

(21) Appl. No.: 11/312,168

(22) Filed: Dec. 20, 2005

(65) Prior Publication Data

US 2006/0140570 A1   Jun. 29, 2006
US 2006/0233511 A9   Oct. 19, 2006

(30) Foreign Application Priority Data

Dec. 27, 2004   (DE) .................. 10 2004 062 849

(51) Int. Cl.
*H01S 4/00* (2006.01)
*H04B 10/12* (2006.01)

(52) U.S. Cl. ................. 359/341.1; 359/341.5; 372/6; 385/126; 385/127

(58) Field of Classification Search ............. 359/341.1, 359/341.5; 372/6; 385/126, 127
See application file for complete search history.

(56) References Cited

U.S. PATENT DOCUMENTS

| | | | | |
|---|---|---|---|---|
| 5,259,046 A | * | 11/1993 | DiGiovanni et al. | 385/12 |
| 6,084,996 A | * | 7/2000 | Judkins et al. | 385/37 |
| 6,240,108 B1 | * | 5/2001 | Ionov | 372/6 |
| 6,288,835 B1 | * | 9/2001 | Nilsson et al. | 359/341.3 |
| 6,445,494 B1 | * | 9/2002 | Nilsson et al. | 359/341.1 |
| 6,965,469 B2 | * | 11/2005 | Avizonis et al. | 359/341.1 |
| 2004/0218635 A1 | * | 11/2004 | Schlueter et al. | 372/6 |
| 2006/0056807 A1 | * | 3/2006 | Grier | 386/78 |
| 2006/0103919 A1 | * | 5/2006 | DiGiovanni et al. | 359/341.5 |

* cited by examiner

Primary Examiner—Thomas H. Tarcza
Assistant Examiner—Eric Bolda
(74) Attorney, Agent, or Firm—Fulbright & Jaworski LLP

(57) ABSTRACT

A laser-active optical fiber for a fiber laser or an optical fiber amplifier contains a laser-active fiber core (2) comprising an undoped inner region (22) which is surrounded by an outer region (24) that is doped with a laser-active material. In this manner a high-power laser beam may be generated which has a mode structure, present in the form of a ring mode, which in particular is suitable for laser machining.

5 Claims, 1 Drawing Sheet

LASER-ACTIVE OPTICAL FIBER FOR A FIBER LASER OR AN OPTICAL FIBER AMPLIFIER

This application claims priority from DE 10 2004 062 849.1 filed Dec. 27, 2004, incorporated herein by reference in its entirety.

FIELD OF THE INVENTION

The invention relates to a laser-active optical fiber for a fiber laser or an optical fiber amplifier. The invention further relates to a fiber laser having such a laser-active optical fiber.

BACKGROUND AND PRIOR ART

Fiber lasers or fiber amplifiers contain an optical fiber as laser-active medium, the fiber core of which is doped with a laser-active material such as neodymium Nd, ytterbium Yb, or erbium Er. This doped fiber core is enclosed by so-called pump light cladding into which the pump light is injected. The advantages of such a fiber laser or fiber amplifier lie in its simple design, high excitation efficiency, efficient cooling due to its large surface area, and high beam quality which can be attained.

High beam quality is attainable in particular when a monomodal or fund amental mode fiber is used as optical fiber, the laser-active fiber core of which has a diameter in the range of only several μm. For such a small diameter of the fiber core, only the fundamental mode TEM00 which has optimal beam quality can oscillate in such a small diameter of the fiber core.

However, a disadvantage of the small diameter of the fiber core required herefor is that, at such a small diameter, high laser power is associated with correspondingly high power densities. These power densities may result in undesired nonlinear effects, and may even lead to destruction of the optical fiber. To allow higher power to be achieved, it is therefore necessary to enlarge the fiber core. However, this is accompanied by a degradation of the beam quality. At fiber core diameters greater than approximately 20 μm, oscillation of higher modes may be suppressed only with great difficulty.

SUMMARY OF THE INVENTION

The object of the invention is to provide a laser-active optical fiber for a fiber laser or an optical fiber amplifier which allows a high-power laser beam to be generated which has suitable high beam quality, in particular for machining a workpiece with high beam quality. A further object of the invention is to provide such an improved fiber laser.

DETAILED DESCRIPTION OF PREFERRED EMBODIMENTS

Figure 1:
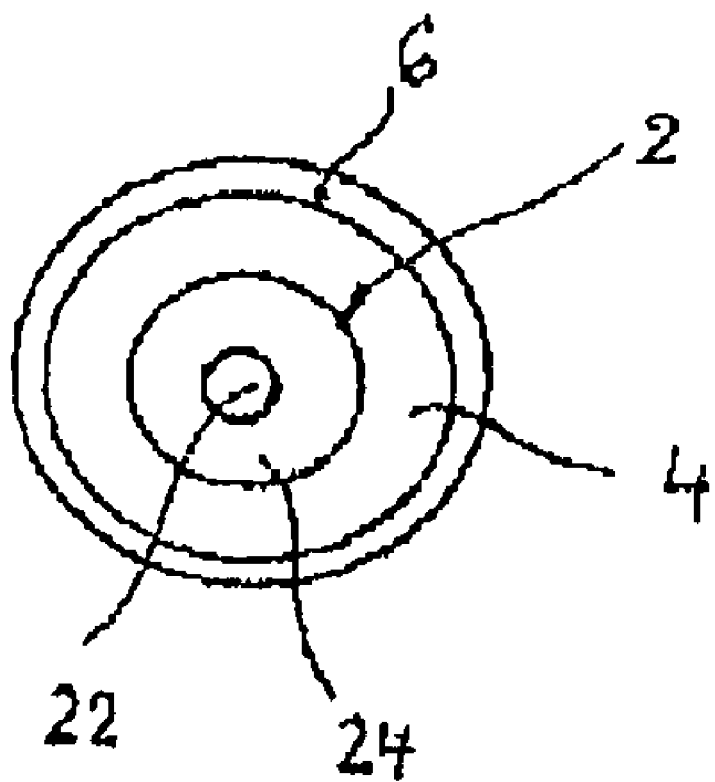
FIG. 1 depicts a cross-sectional view of the invention.

The invention will be described in greater detail in the disclosure which follows.

The referenced objects are achieved by the features of claims 1 and 3. Since the laser-active fiber core of the optical fiber has an undoped inner region which is surrounded by an outer region that is doped with a laser-active material, a laser beam is generated which has a stable mode structure in the form of a ring mode or a mixture of various ring modes. These stable ring modes are formed by the shape of the tubular laser-active region, since no amplification occurs in the undoped inner region. As a result of the larger volume which is then present in the annular- or tubular-shaped outer region, it is possible to increase the power of the fiber laser or of the optical fiber amplifier at the same power density. In particular, a stable ring mode TEM01* (donut mode) may be produced by suitable dimensioning of the inner and outer regions, even for a larger diameter of the fiber core.

The invention is based on the consideration that, for a number of applications in the power range above 500 W, in particular for laser cutting or laser drilling, a ring mode may be even more advantageous that the fundamental mode.

A fiber laser constructed using such an optical fiber preferably contains an optical element inside the resonator for producing radial polarization of the laser beam. Such a radial polarization of the laser beam is particularly advantageous for laser drilling or laser cutting, since the machining is independent of the azimuth angle, i.e., is rotationally symmetrical about the beam axis.

To further explain the invention, reference is made to the exemplary embodiment in the drawing, the only figure of which shows an optical fiber according to the invention in a cross-sectional schematic illustration.

The optical fiber contains a laser-active fiber core 2, which is surrounded by fiber or pump light cladding 4 for guiding the pump light. This pump light cladding 4 is enclosed by an outer sheathing 6. The fiber core 2 is composed of an undoped, i.e., laser-inactive, cylindrical inner region 22, which in the sectional view is annularly surrounded by a hollow-cylindrical outer region 24 that is doped with a laser-active material. To produce a TEM01* ring mode, the diameter of the undoped inner region 22 preferably is approximately between 5 μm and 10 μm, while the diameter of the outer region 24 is preferably between 30 μm and 40 μm.

When the optical fiber is used as a fiber laser, it is provided on its end faces, for example, with highly reflective or partially reflective mirrors, which may be dielectric reflective layers or so-called volume Bragg gratings. An optical element for producing radial polarization of the laser beam may also be provided inside the resonator. To this end, the rear mirror, for example, may be provided with a diffractive structure.

Other facts of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

The invention claimed is:

1. A laser-active optical fiber for a fiber laser or an optical fiber amplifier, having a laser-active fiber core (2) comprising an undoped inner region (22) which is surrounded by an outer region (24) that is doped with a laser-active material, wherein said undoped inner region (22) and said undoped outer region (24) are dimensioned such that only the ring mode TEM01* can oscillate.

2. A fiber laser comprising the laser active optical fiber of claim 1.

3. The fiber laser of claim 2, further comprising an optical resonator having an internal optical element which causes radial polarization of a laser beam produced by said fiber layer.

4. The fiber laser of claim 2, comprising a fiber core doped with a laser active material selected from the group consisting of Nd, Yb, and Er.

5. The laser-active optical fiber of claim 1 wherein said undoped inner region has a diameter between 5 μm and 10 μm and said outer region has a diameter between 30 μm and 40 μm.

* * * * *